United States Patent
Kang (10) Patent No.: US 11,952,047 B2
(45) Date of Patent: Apr. 9, 2024

(54) REAR FLOOR SIDE MEMBER ASSEMBLY

(71) Applicants: Hyundai Motor Company, Seoul (KR); Kia Corporation, Seoul (KR)

(72) Inventor: ChangHak Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 17/237,755

(22) Filed: Apr. 22, 2021

(65) Prior Publication Data

US 2022/0204093 A1    Jun. 30, 2022

(30) Foreign Application Priority Data

Dec. 30, 2020    (KR) .................. 10-2020-0188245

(51) Int. Cl.
  *B62D 25/20*    (2006.01)
  *B62D 25/08*    (2006.01)
  *B62D 25/18*    (2006.01)

(52) U.S. Cl.
  CPC ....... *B62D 25/2027* (2013.01); *B62D 25/088* (2013.01); *B62D 25/18* (2013.01); *B62D 25/2036* (2013.01)

(58) Field of Classification Search
  CPC .. B62D 25/2027; B62D 25/088; B62D 25/18; B62D 25/2036; B62D 21/00; B62D 21/152; B62D 21/155; B60D 25/00; B60D 25/08; B60D 25/087; B60D 25/2027; B60D 25/088; B60D 25/16; B60D 25/18; B60D 25/20; B60D 25/2009; B60D 25/2036

USPC ......... 296/204, 30, 209, 198, 187.11, 203.04
See application file for complete search history.

(56) References Cited

U.S. PATENT DOCUMENTS

| | | | |
|---|---|---|---|
| 2016/0083011 A1* | 3/2016 | Kawaguchi | B62D 21/08 296/203.01 |
| 2018/0273108 A1* | 9/2018 | Masuda | B62D 25/088 |
| 2019/0389515 A1* | 12/2019 | Nakauchi | B60G 99/002 |
| 2020/0086922 A1* | 3/2020 | Yamada | B62D 25/088 |
| 2020/0269922 A1* | 8/2020 | Kiyoshita | B62D 21/155 |
| 2020/0331538 A1* | 10/2020 | Nishimura | B62D 25/16 |
| 2021/0214016 A1* | 7/2021 | Ito | B62D 25/088 |

FOREIGN PATENT DOCUMENTS

JP    4045778 B2 *    2/2008    ............. B62D 25/08

OTHER PUBLICATIONS

Ikeda et al., "Structure of Rear Portion of Car Body", Published: Feb. 13, 2008, Publisher: Japanese Patent Office, Edition: JP4045778B2 (Year: 2008).*

* cited by examiner

*Primary Examiner* — Joseph D. Pape
(74) *Attorney, Agent, or Firm* — Slater Matsil, LLP (57) ABSTRACT

An embodiment rear floor side member assembly includes a rear side member including a rear inner portion disposed toward an inside of a vehicle body, a rear upper portion curved toward an outside of the vehicle body from the rear inner portion, and a rear lower portion curved from the rear inner portion toward the outside of the vehicle body, a reinforcement mounting portion formed on the rear lower portion, a rear side member reinforcement mounted on the reinforcement mounting portion, and a rear spring seat assembly mounted at a bottom part of the rear side member reinforcement.

20 Claims, 8 Drawing Sheets

REAR FLOOR SIDE MEMBER ASSEMBLY

CROSS-REFERENCE TO RELATED APPLICATIONS

This application claims the benefit of Korean Patent Application No. 10-2020-0188245, filed in the Korean Intellectual Property Office on Dec. 30, 2020, which application is hereby incorporated herein by reference.

TECHNICAL FIELD

The present disclosure relates to a rear floor side member assembly.

BACKGROUND

A rear floor of the vehicle body is a structure corresponding to the lower rear part of the vehicle. In the case of a passenger vehicle, it forms a trunk room, supports the rear seats of the vehicle, and absorbs rear collisions.

In a vehicle such as an RV vehicle or a minivan, a sliding rail supporting the seat may be mounted, and a rear spring seat assembly of the rear suspension may be mounted.

However, in order to mount the sliding rail and rear spring sheet assembly, a configuration for reinforcing strength and a configuration for mounting are required, which can increase the vehicle weight and number of parts.

In particular, in the case of a vehicle to which a pop-up sinking seat is applied, there is a problem that the mount space becomes narrow.

The above information disclosed in this Background section is only for enhancement of understanding of the background of the invention, and therefore it may contain information that does not form the prior art that is already known to a person of ordinary skill in the art.

SUMMARY

Embodiments of the present invention generally relate to a rear floor side member assembly. Particular embodiments relate to a rear floor side member assembly capable of mounting a seat rail and a rear spring seat assembly.

Embodiments of the present invention provide a rear floor side member assembly that facilitates mounting of a seat rail and a rear spring seat assembly.

A rear floor side member assembly according to an exemplary embodiment of the present invention may include a rear side member including a rear inner portion disposed toward an inside of a vehicle body, a rear upper portion curved toward an outside of the vehicle body from the rear inner portion, and a rear lower portion curved from the rear inner portion toward the outside of the vehicle body and the rear lower portion having a reinforcement mounting portion formed thereon, a rear side member reinforcement mounted on the reinforcement mounting portion, and a rear spring seat assembly mounted at the bottom of the rear side member reinforcement.

The rear floor side member assembly may further include a seat rail mounted on an upper part of the rear upper portion.

The rear side member may further include a rear side member outer panel coupled with the rear upper portion and the rear lower portion.

The rear side member may further include a rear upper portion flange bent from the rear upper portion to be coupled with the rear side member outer panel, and a rear lower portion flange bent from the rear lower portion to be coupled with the rear side member outer panel.

The rear side member reinforcement may include a rear spring seat assembly connection portion on which the rear spring seat assembly of the rear suspension is mounted.

The rear side member reinforcement may further include a reinforcement inner flange portion bent to couple with the rear inner portion.

The rear side member reinforcement may further include a reinforcement surface curved along the shape of the rear spring seat assembly connection portion.

The rear side member outer panel may include a reinforcement surface connection portion formed along the shape of the reinforcement surface.

The rear floor side member assembly may further include a wheel housing connected with the rear side member, and a wheel housing reinforcement coupled along the wheel housing from the reinforcement surface connection portion.

The rear spring seat assembly may further include a rear spring seat assembly pipe protruded into the upper direction, and the rear floor side member assembly may further include a rear spring seat assembly pipe reinforcement that supports the rear spring seat assembly pipe and is mounted between the rear upper portion and the rear side member reinforcement.

An insertion hole into which the rear spring seat assembly pipe is inserted may be formed in the rear side member reinforcement.

The rear upper portion may be bent vertically from the rear inner portion, and the rear lower portion may be curved at an obtuse angle from the rear inner portion.

The rear floor side member assembly may further include a forming portion formed along the length direction between the rear upper portion and the rear inner portion.

The rear floor side member assembly according to an exemplary embodiment of the present invention makes it easy to mount the seat rail and rear spring seat assembly.

The rear floor side member assembly according to an exemplary embodiment of the present invention may secure a mount space for mounting a pop-up sinking seat.

In addition, the effects obtained or predicted by exemplary embodiments of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference only to describe exemplary embodiments of the present invention, the technical idea of the present invention should not be interpreted as being limited to the accompanying drawings.

The following elements may be used in connection with the drawings to describe embodiments of the present invention.

| | |
|---|---|
| 10: rear floor side member assembly | |
| 20: rear side member | 22: rear inner portion |
| 24: rear upper portion | 26: rear lower portion |
| 28: reinforcement mounting portion | 30: rear upper portion flange |
| 32: rear lower portion flange | 34: forming portion |
| 40: rear side member reinforcement | |
| 42: rear spring seat assembly connection portion | |
| 44: reinforcement inner flange portion | 46: reinforcement surface |
| 48: insertion hole | |
| 60: rear spring seat assembly | |
| 62: rear spring seat assembly pipe | |
| 70: rear spring seat assembly pipe reinforcement | |
| 72: pipe connection portion | 80: seat rail |
| 82: nut | |
| 90: rear side member outer panel | |
| 92: reinforcement surface connection portion | |
| 100: wheel housing | |
| 102, 104: wheel housing reinforcement | |
| 110: rear floor member | |
| 120: seat sinking portion | 130: quarter panel |

DETAILED DESCRIPTION OF ILLUSTRATIVE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Parts indicated by the same reference numerals throughout the specification refer to the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in the middle.

In contrast, when an element is referred to as being "directly on" another element, there are no intervening elements present.

Throughout the specification, when a part "includes" a certain component, it means that other components may be further included rather than excluding other components unless specifically stated to the contrary.

Exemplary embodiments of the present invention will hereinafter be described in detail with reference to the accompanying drawings.

Figure 1:
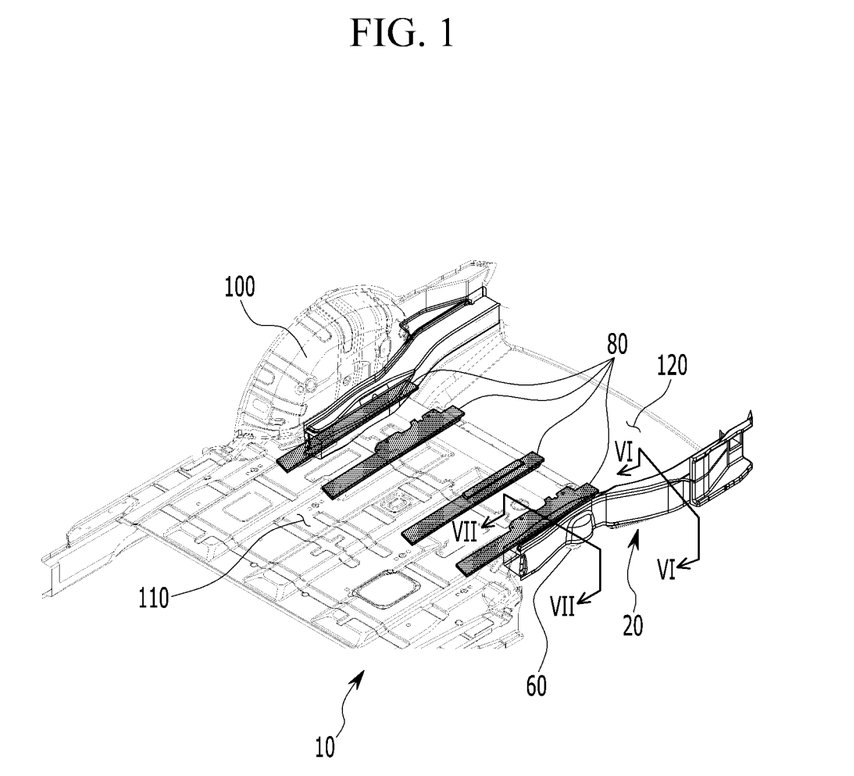
FIG. 1 is a perspective view of a rear floor side member mounting a rear suspension according to an exemplary embodiment of the present invention.
Figure 2:
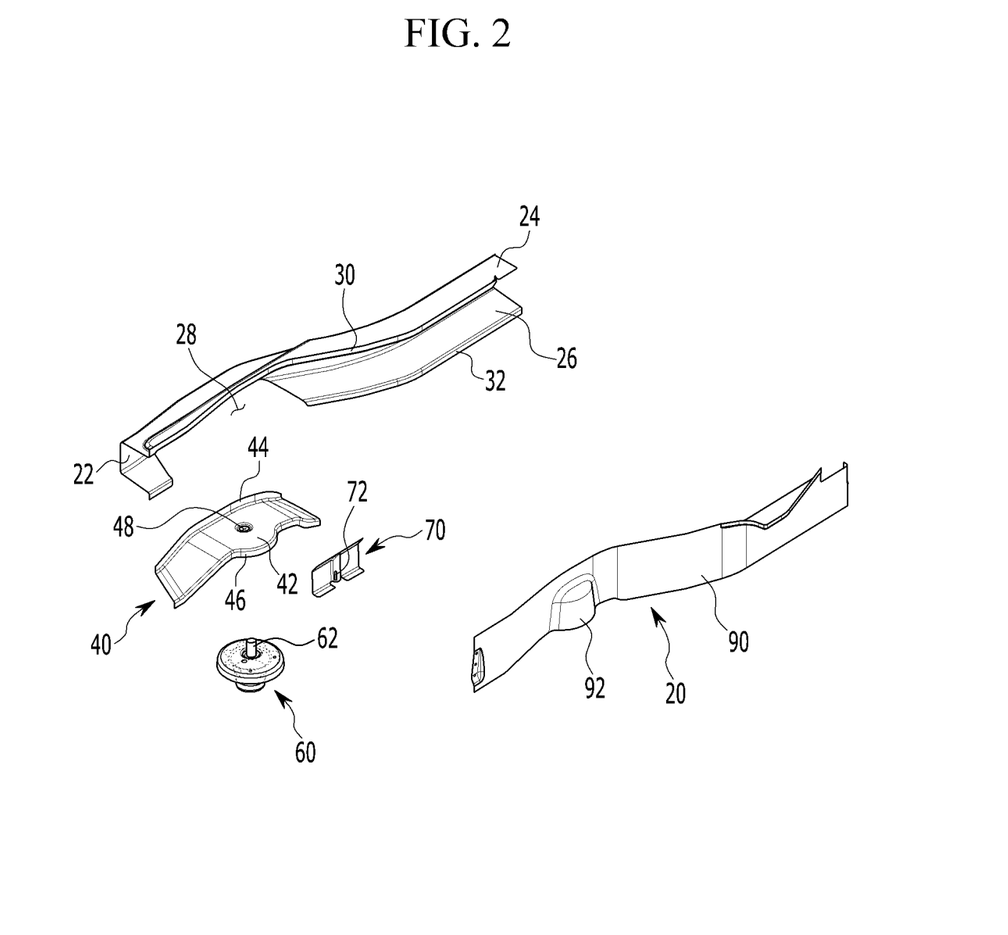
FIG. 2 is a partially exploded perspective view of a rear floor side member mounting a rear suspension according to an exemplary embodiment of the present invention.

FIG. 1 is a perspective view of a rear floor side member mounting a rear suspension according to an exemplary embodiment of the present invention, and FIG. 2 is a partially exploded perspective view of a rear floor side member mounting a rear suspension according to an exemplary embodiment of the present invention.

Referring to FIG. 1 and FIG. 2, a rear floor side member assembly 10 according to an exemplary embodiment of the present invention may include a rear side member 20 including a rear inner portion 22 disposed toward an inside of a vehicle body, a rear upper portion 24 curved toward an outside of the vehicle body from the rear inner portion 22, and a rear lower portion 26 curved from the rear inner portion 22 toward the outside of the vehicle body and the rear lower portion 26 having a reinforcement mounting portion 28 formed thereon, a rear side member reinforcement 40 mounted on the reinforcement mounting portion 28, and a rear spring seat assembly 60 mounted at the bottom of the rear side member reinforcement 40.

The rear spring seat assembly 60 is a configuration that mounts the rear suspension to the vehicle body, and the specific configuration and function of the rear spring seat assembly 60 and the rear suspension are obvious to those of ordinary skill in the art, and thus, detailed description will be omitted.

The rear floor side member assembly 10 may further include a seat rail 80 mounted on an upper part of the rear upper portion 24. The seat rail 80 may be disposed above the rear floor member no that forms the floor of the cabin room.

The rear side member 20 may further include a rear side member outer panel 90 coupled to the rear upper portion 24 and the rear lower portion 26.

The rear side member 20 may further include a rear upper portion flange 30 bent from the rear upper portion 24 to be coupled with the rear side member outer panel 90, and a rear lower portion flange 32 bent from the rear lower portion 26 to be coupled with the rear side member outer panel 90.

Figure 3:
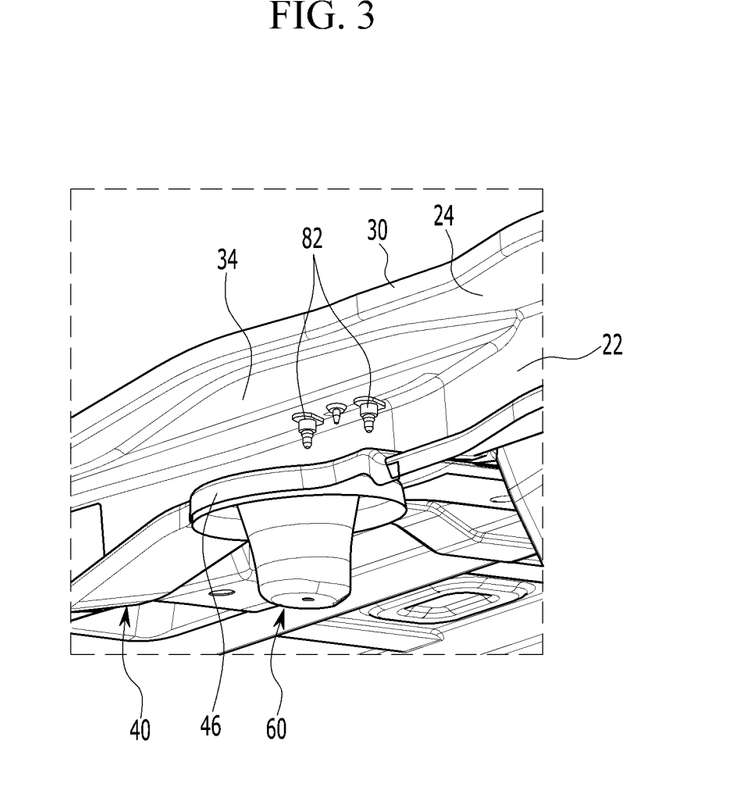
FIG. 3 and FIG. 4 are partial perspective views of a rear floor side member mounting a rear suspension according to an exemplary embodiment of the present invention.
Figure 4:
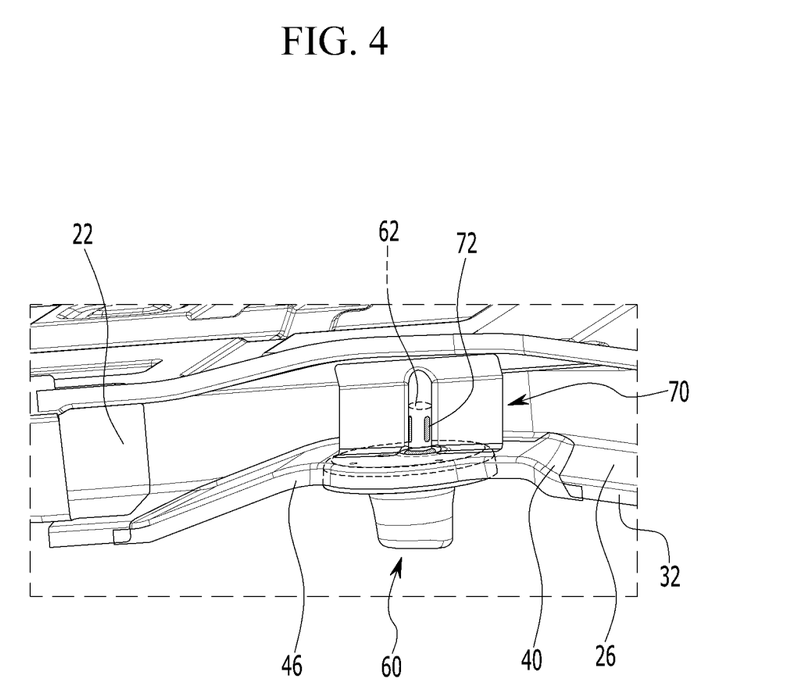

FIG. 3 and FIG. 4 are partial perspective views of a rear floor side member mounting a rear suspension according to an exemplary embodiment of the present invention.

Referring to FIG. 1 to FIG. 4, in the rear floor side member assembly 10 according to an exemplary embodiment of the present invention, the seat rail 80 may be mounted on the rear upper portion 24 without a separate bracket structure.

The rear floor side member assembly 10 according to an exemplary embodiment of the present invention may mount the seat rail 80 to the rear side member 20 without a separate bracket for mounting the seat rail 80. For example, the seat rail 80 may be mounted to the rear side member 20 through bolts and nuts (82; see FIG. 3 and FIG. 7) without a separate bracket structure, reducing the number of parts and weight.

The rear side member reinforcement 40 may include a rear spring seat assembly connection portion 42 on which the rear spring seat assembly 60 of the rear suspension is mounted. The rear spring seat assembly connection portion 42 may be formed in a semicircular shape along the exterior of the rear spring seat assembly 60 of the rear suspension, but is not limited thereto.

The rear side member reinforcement 40 may further include a reinforcement inner flange portion 44 bent to couple with the rear inner portion 22. The reinforcement inner flange portion 44 is bent, so that the strength of the rear side member reinforcement 40 may be increased, and the connection between the rear side member reinforcement 40 and the rear side member 20 may be made more robust. The rear side member reinforcement 40 and the rear side member 20 may be welded together, but is not limited thereto.

The rear side member reinforcement 40 may further include a reinforcement surface 46 curved along the shape of the rear spring seat assembly connection portion 42. The reinforcement surface 46 may increase the strength of the rear spring seat assembly connection portion 42 on which the rear spring seat assembly 60 of the rear suspension is mounted.

The rear side member outer panel 90 may further include a reinforcement surface connection portion 92 formed according to a shape of the reinforcement surface 46. The strength of the rear spring seat assembly connection portion 42 may be increased by the reinforcement surface connection portion 92, and the load of the rear suspension transmitted through the rear spring seat assembly 60 is transferred to the vehicle body through the rear side member outer panel 90.

The rear spring seat assembly 60 further includes a rear spring seat assembly pipe 62 protruded in an upper direction. And the rear floor side member assembly 10 according to an exemplary embodiment of the present invention may further include a rear spring seat assembly pipe reinforcement 70 that supports the rear spring seat assembly pipe 62 and is mounted between the rear upper portion 24 and the rear side member reinforcement 40. A pipe connection portion 72 is formed in the rear spring seat assembly pipe reinforcement 70, so that the rear spring seat assembly pipe 62 may be inserted into and coupled to the pipe connection portion 72. Therefore, the load of the rear suspension transmitted through the rear spring seat assembly 60 may be distributed to the vehicle body through the rear spring seat assembly pipe reinforcement 70. The rear spring seat assembly pipe reinforcement 70 may be mounted along the height direction of the vehicle body.

An insertion hole 48 into which the rear spring seat assembly pipe 62 is inserted may be formed in the rear side member reinforcement 40, and the rear spring seat assembly 60 may be firmly seated in the rear spring seat assembly connection portion 42.

Figure 5:
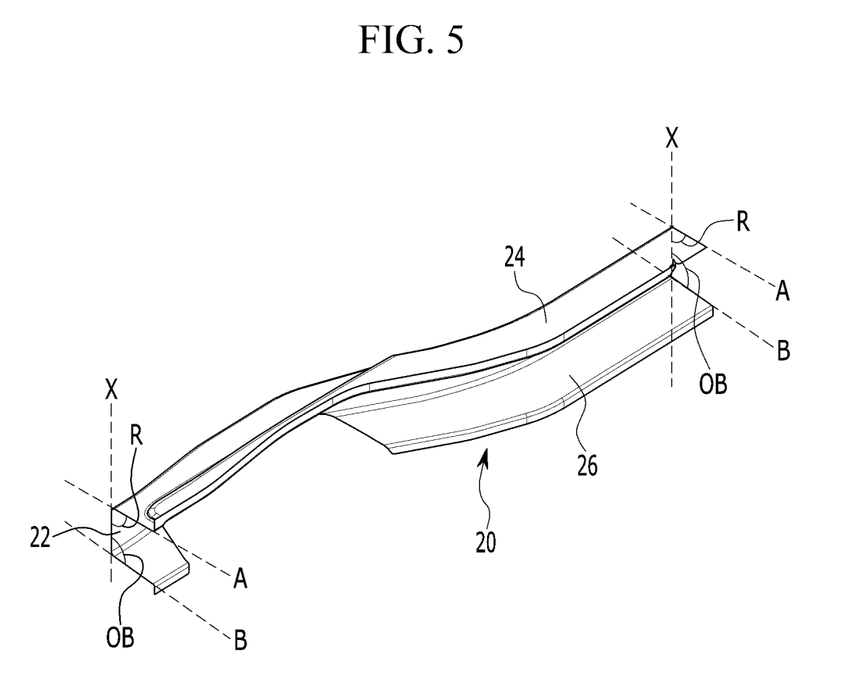
FIG. 5 is a perspective view of a rear side member that may be applied to a rear floor side member mounting a rear suspension according to an exemplary embodiment of the present invention.
Figure 6:
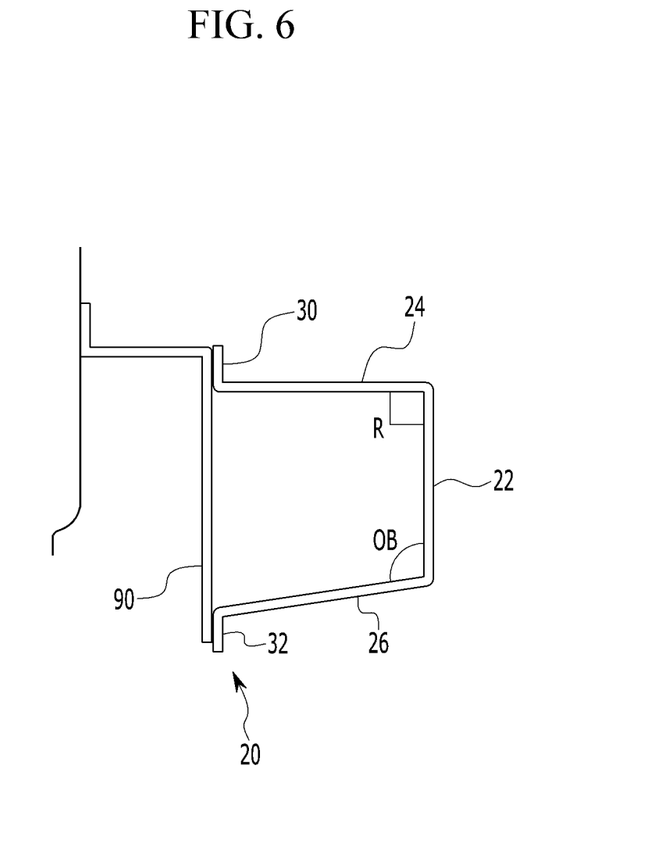
FIG. 6 is a cross-sectional view along the line VI-VI in FIG. 1.
Figure 7:
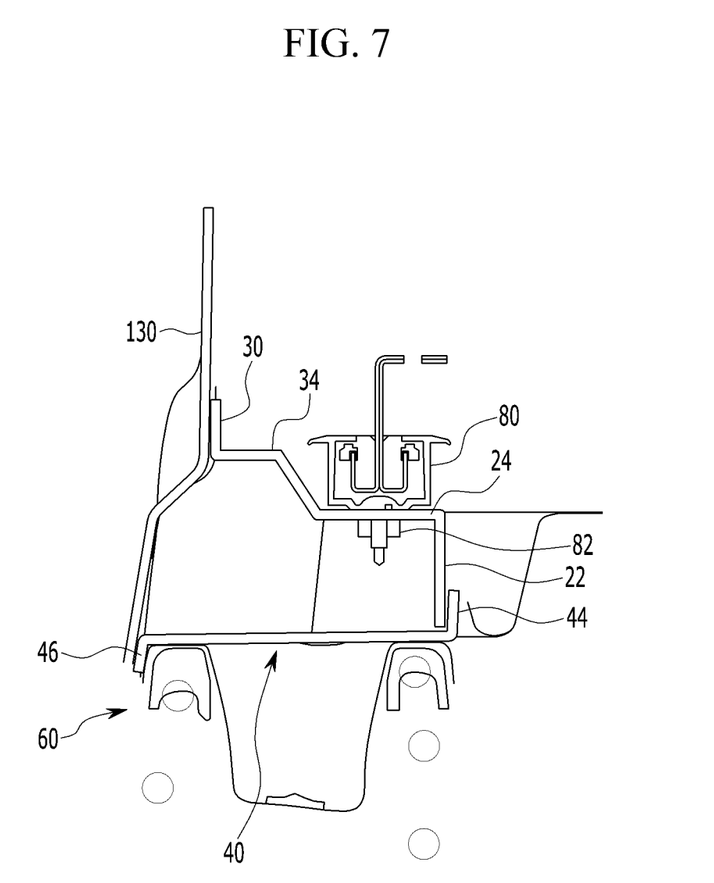
FIG. 7 is a cross-sectional view along the line VII-VII in FIG. 1.

FIG. 5 is a perspective view of a rear side member that may be applied to a rear floor side member mounting a rear suspension according to an exemplary embodiment of the present invention, FIG. 6 is a cross-sectional view along the line VI-VI in FIG. 1, and FIG. 7 is a cross-sectional view along the line VII-VII in FIG. 1.

Referring to FIG. 1 to FIG. 7, the rear upper portion 24 may be curved vertically (R) from the rear inner portion 22, and the rear lower portion 26 may be curved from the rear inner portion 22 to an obtuse angle (OB).

In order to manufacture the rear side member 20, the mold removal angle must be considered, and the rear lower portion 26 is bent from the rear inner portion 22 to an obtuse angle (OB), making the rear side member 20 easy to manufacture.

In the case of a rear side member with a general shape open to the upper direction or a rear side member with a shape open to the side of the vehicle body, the configuration to mount the seat rail or the part to mount the rear suspension is not parallel to the ground so that the seat rail or rear suspension must be mounted through a bracket configuration. However, in the rear floor side member for mounting the rear suspension according to an exemplary embodiment of the present invention, the rear lower portion 26 is bent at an obtuse angle from the rear inner portion 22 to form a mold subtraction angle, and the rear spring seat assembly 60 may be mounted using the rear side member reinforcement 40. Therefore, the entire configuration of the rear floor side member for mounting the rear suspension according to an exemplary embodiment of the present invention is simplified, and the number of parts and weight may be reduced.

The rear floor side member assembly 10 according to an exemplary embodiment of the present invention may further include a forming portion 34 formed along its length direction between the rear upper portion 24 and the rear inner portion 22. By the bending shape of the forming portion 34, the side strength of the rear side member 20, for example, strength against the load transmitted from the quarter panel 130 in the event of a vehicle collision, may be secured.

Figure 8:
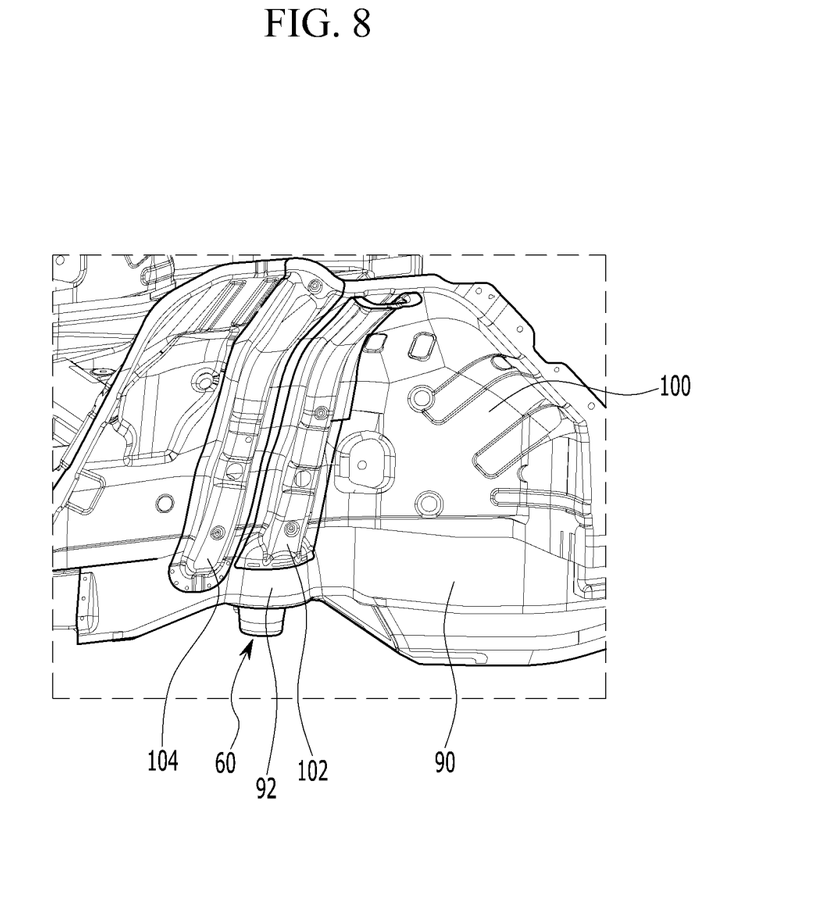
FIG. 8 illustrates a wheel housing applicable to a rear floor side member mounting a rear suspension according to an exemplary embodiment of the present invention.

FIG. 8 illustrates a wheel housing applicable to a rear floor side member mounting a rear suspension according to an exemplary embodiment of the present invention.

Referring to FIG. 8, the rear floor side member assembly 10 according to an exemplary embodiment of the present invention further includes a wheel housing 100 that combines with the rear side member 20 and a wheel housing reinforcement 102 coupled along the wheel housing 100 from the reinforcement surface connection portion 92.

The wheel housing reinforcement 102 transfers the load transmitted from the rear spring seat assembly 60 to the wheel housing 100 and vehicle body through the reinforcement surface connection portion 92 of the rear side member outer panel 90 to distribute the load.

Additionally, a wheel housing reinforcement 104 connecting the rear side member outer panel 90 and the wheel housing 100 may be further provided.

Referring to FIG. 1 and FIG. 2, the rear side member 20 may be bent in the width direction of the vehicle body at the portion where the rear side member reinforcement 40 is mounted.

The rear floor side member assembly according to an exemplary embodiment of the present invention may secure a mount space for mounting a pop-up sinking seat, that is, a seat sinking portion 120.

Since the rear side member 20 is bent in the width direction of the vehicle body at the part where the rear side member reinforcement 40 is mounted, and separate brackets for mounting the rear spring seat assembly 60 and the seat rail 80 are not required, the vehicle body width and direction length may be relatively reduced, and the seat sinking portion 120 for mounting the pop-up sinking seat may be secured.

As described above, in the rear floor side member assembly according to an exemplary embodiment of the present invention, the upper part of the rear side member 20 forms a car line, and the lower part is a slanted surface for the subtraction angle, so that it is easy to manufacture the rear side member 20.

In the rear floor side member assembly according to an exemplary embodiment of the present invention, a part of the rear lower portion 26 is cut to form the reinforcement mounting portion 28, and the rear side member reinforcement 40 is mounted on the reinforcement mounting portion 28. In this case, when the arm trajectory of the rear suspension is changed or the suspension geometry is changed, it is possible to respond only by changing the design of the rear side member reinforcement 40.

The upper part of the rear side member 20 forms the car line, and the rear side member reinforcement 40 is combined into an "L" shape, which can increase the strength of the rear side member 20. And the rear side member outer panel 90 forms a closed cross-section and is joined to increase the strength of the rear side member 20.

The rear spring seat assembly pipe reinforcement 70 may be mounted to distribute the load of the rear suspension transmitted through the rear spring seat assembly 60.

The load may be distributed to the vehicle body through the rear spring seat assembly pipe reinforcement 70. The rear spring seat assembly pipe reinforcement 70 may be mounted along the height direction of the vehicle body.

By the bending shape of the forming portion 34, it is possible to secure the strength against the load transmitted from the quarter panel 130 when the vehicle collides.

The rear floor side member assembly according to an exemplary embodiment of the present invention may mount the seat rail 80 and the rear spring seat assembly 60 without a separate bracket configuration, and may relatively reduce the length of the vehicle body width direction, so that it is possible to secure a sinking well space and increase cargo space.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear floor side member assembly comprising:
   a rear side member including a rear inner portion disposed toward an inside of a vehicle body, a rear upper portion curved toward an outside of the vehicle body from the rear inner portion, and a rear lower portion curved from the rear inner portion toward the outside of the vehicle body;
   a reinforcement mounting portion formed on the rear lower portion;
   a rear side member reinforcement mounted on the reinforcement mounting portion;
   an insertion hole formed in the rear side member reinforcement;
   a rear spring seat assembly pipe reinforcement;
   a pipe connection portion formed in the rear spring seat assembly pipe reinforcement; and
   a rear spring seat assembly mounted at a bottom part of the rear side member reinforcement, wherein the rear spring seat assembly comprises a rear spring seat assembly pipe protruding in an upper direction, inserted in the insertion hole, and inserted into and coupled to the pipe connection portion.

2. The rear floor side member assembly of claim 1, further comprising a seat rail mounted on an upper part of the rear upper portion.

3. The rear floor side member assembly of claim 1, wherein the rear side member further comprises a rear side member outer panel coupled with the rear upper portion and the rear lower portion.

4. The rear floor side member assembly of claim 3, wherein the rear side member further comprises:
   a rear upper portion flange bent from the rear upper portion to be coupled with the rear side member outer panel; and
   a rear lower portion flange bent from the rear lower portion to be coupled with the rear side member outer panel.

5. The rear floor side member assembly of claim 1, wherein the rear side member reinforcement includes a rear spring seat assembly connection portion, wherein the rear spring seat assembly is mounted on the rear spring seat assembly connection portion.

6. The rear floor side member assembly of claim 1, wherein the rear side member reinforcement includes a reinforcement inner flange portion bent to couple with the rear inner portion.

7. The rear floor side member assembly of claim 1, wherein the rear spring seat assembly pipe reinforcement supports the rear spring seat assembly pipe and is mounted between the rear upper portion and the rear side member reinforcement.

8. The rear floor side member assembly of claim 1, wherein:
   the rear upper portion is bent vertically at a right angle from the rear inner portion; and
   the rear lower portion is curved at an obtuse angle from the rear inner portion.

9. The rear floor side member assembly of claim 1, further comprising a forming portion formed along a length direction between the rear upper portion and the rear inner portion.

10. A rear floor side member assembly comprising:
    a rear side member comprising:
       a rear inner portion disposed toward an inside of a vehicle body;
       a rear upper portion curved toward an outside of the vehicle body from the rear inner portion;
       a rear lower portion curved from the rear inner portion toward the outside of the vehicle body; and
       a rear side member outer panel coupled with the rear upper portion and the rear lower portion;
    a reinforcement mounting portion formed on the rear lower portion;
    a rear side member reinforcement mounted on the reinforcement mounting portion, wherein an insertion hole is formed in the rear side member reinforcement, and wherein the rear side member reinforcement comprises:
       a rear spring seat assembly connection portion; and
       a reinforcement surface curved along a shape of the rear spring seat assembly connection portion;
    a rear spring seat assembly pipe reinforcement;
    a pipe connection portion formed in the rear spring seat assembly pipe reinforcement; and
    a rear spring seat assembly mounted at a bottom part of the rear side member reinforcement, wherein the rear spring seat assembly comprises a rear spring seat assembly pipe protruding in an upper direction, inserted in the insertion hole, and inserted into and coupled to the pipe connection portion.

11. The rear floor side member assembly of claim 10, wherein the rear side member outer panel includes a reinforcement surface connection portion formed along a shape of the reinforcement surface.

12. The rear floor side member assembly of claim 11, further comprising:
    a wheel housing connected with the rear side member; and
    a wheel housing reinforcement coupled along the wheel housing from the reinforcement surface connection portion.

13. A vehicle comprising:
    a vehicle body;
    a rear side member comprising:
       a rear inner portion disposed toward an inside of the vehicle body;
       a rear upper portion curved toward an outside of the vehicle body from the rear inner portion; and
       a rear lower portion curved from the rear inner portion toward the outside of the vehicle body;
    a reinforcement mounting portion formed on the rear lower portion;
    a rear side member reinforcement mounted on the reinforcement mounting portion;

an insertion hole formed in the rear side member reinforcement;
a rear spring seat assembly pipe reinforcement;
a pipe connection portion formed in the rear spring seat assembly pipe reinforcement;
a rear spring seat assembly mounted at a bottom part of the rear side member reinforcement, wherein the rear spring seat assembly comprises a rear spring seat assembly pipe protruding in an upper direction, inserted in the insertion hole, and inserted into and coupled to the pipe connection portion; and
a seat rail mounted on an upper part of the rear upper portion.

14. The vehicle of claim 13, wherein the rear side member further comprises:
a rear side member outer panel coupled with the rear upper portion and the rear lower portion;
a rear upper portion flange bent from the rear upper portion and coupled with the rear side member outer panel; and
a rear lower portion flange bent from the rear lower portion and coupled with the rear side member outer panel.

15. The vehicle of claim 13, wherein the rear side member reinforcement further comprises a rear spring seat assembly connection portion, wherein the rear spring seat assembly is mounted on the rear spring seat assembly connection portion.

16. The vehicle of claim 13, wherein the rear side member reinforcement further comprises a reinforcement inner flange portion bent to couple with the rear inner portion.

17. The vehicle of claim 13, wherein the rear spring seat assembly pipe reinforcement supports the rear spring seat assembly pipe and is mounted between the rear upper portion and the rear side member reinforcement.

18. The vehicle of claim 13, wherein:
the rear upper portion is bent vertically at a right angle from the rear inner portion; and
the rear lower portion is curved at an obtuse angle from the rear inner portion.

19. The rear floor side member assembly of claim 10, further comprising a seat rail mounted on an upper part of the rear upper portion.

20. The rear floor side member assembly of claim 10, wherein the rear spring seat assembly pipe reinforcement supports the rear spring seat assembly pipe and is mounted between the rear upper portion and the rear side member reinforcement.

\* \* \* \* \*